(12) United States Patent
Stephens, Jr.

(10) Patent No.: US 8,683,493 B2
(45) Date of Patent: Mar. 25, 2014

(54) AUTOMATIC ANNUNCIATOR ALLOCATION

(75) Inventor: James H. Stephens, Jr., Austin, TX (US)

(73) Assignee: Empire Technology Development LLC, Wilmington, DE (US)

( * ) Notice: Subject to any disclaimer, the term of this patent is extended or adjusted under 35 U.S.C. 154(b) by 323 days.

(21) Appl. No.: 13/122,189

(22) PCT Filed: Nov. 15, 2010

(86) PCT No.: PCT/US2010/056661
§ 371 (c)(1),
(2), (4) Date: Apr. 1, 2011

(87) PCT Pub. No.: WO2012/067600
PCT Pub. Date: May 24, 2012

(65) Prior Publication Data
US 2012/0122428 A1    May 17, 2012

(51) Int. Cl.
G06F 3/00 (2006.01)
G06F 9/44 (2006.01)
G06F 9/46 (2006.01)
G06F 13/00 (2006.01)
G06F 9/455 (2006.01)

(52) U.S. Cl.
USPC ............ 719/318; 719/313; 719/320; 718/102

(58) Field of Classification Search
None
See application file for complete search history.

(56) References Cited

U.S. PATENT DOCUMENTS

| | | | |
|---|---|---|---|
| 5,860,124 A * | 1/1999 | Matthews et al. | 711/165 |
| 7,448,048 B1 * | 11/2008 | Nesamoney et al. | 719/318 |
| 8,111,814 B2 * | 2/2012 | Ganesan et al. | 379/88.17 |
| 2002/0120702 A1 | 8/2002 | Schiavone et al. | |
| 2002/0137552 A1 | 9/2002 | Cannon et al. | |
| 2005/0162267 A1 * | 7/2005 | Khandelwal et al. | 340/506 |
| 2007/0220138 A1 | 9/2007 | Ganesan et al. | |
| 2008/0016444 A1 | 1/2008 | Choi | |
| 2008/0272907 A1 * | 11/2008 | Bonansea et al. | 340/539.11 |
| 2009/0112378 A1 | 4/2009 | Robb et al. | |
| 2009/0197582 A1 | 8/2009 | Lewis et al. | |
| 2009/0271792 A1 * | 10/2009 | Mills | 718/103 |

OTHER PUBLICATIONS

Czajkowski et al., "Grid Information Services for Distributed Resource Sharing," 2001, Proc. 10th IEEE International Symposium on High-Performance Distributed Computing (HPDC-10), 14 pages.

(Continued)

Primary Examiner — H S Sough
Assistant Examiner — Craig Dorais
(74) Attorney, Agent, or Firm — Hope Baldauff, LLC

(57) ABSTRACT

Technologies described herein generally relate to allocating annunciators to provide annunciations in response to annunciation requests in a computing device. The computing device may include a platform application, which may be configured to receive annunciation requests from applications for providing annunciations. The platform application may discover annunciators capable of providing the at least one annunciation. The platform application may schedule the annunciation request with one of the discovered annunciators and upon scheduling the annunciation request with one of the discovered annunciator, may cause the scheduled annunciator to provide the annunciation in response to the annunciation request. The technologies presented herein can allocate annunciators according to the demands of a user by determining a prioritization level of an annunciation request and an attention limit of the computing device such that the computing device can manage multiple annunciation requests without inundating a user with extraneous annunciations.

25 Claims, 7 Drawing Sheets

(56) References Cited

OTHER PUBLICATIONS

Harihar et al., "Using Jini to Enable Pervasive Computing Environments," Mar. 18-20, 2005, *Proc. of the 43rd ACM Southeast Conference*, Kennesaw, Georgia, 6 pages.

Kalapriya et al., "A Framework for Resource Discovery in Pervasive Computing for Mobile Aware Rask Execution," 2004, *Proc. of the 1st Conference on Computing Frontiers*, Abstract only.

Li et al., "Predicting Individual Priorities of Shared Activities Using Support Vector Machines," 2007, *Proc. of the 16th ACM Conference on Conference on Information and Knowledge Management*, Abstract only.

Ringel et al., "Automated Message Prioritization: Making Voicemail Retrieval More Efficient," Apr. 20-25, 2002, *CHI '02 Extended Abstracts on Human Factors in Computing Systems*, Minneapolis, Minnesota, 2 pages.

International Search Report dated Mar. 2, 2011 in International Serial No. PCT/US10/56661.

Korean Official Action date Dec. 26, 2013 in Korean Application No. 2013-7002860.

\* cited by examiner

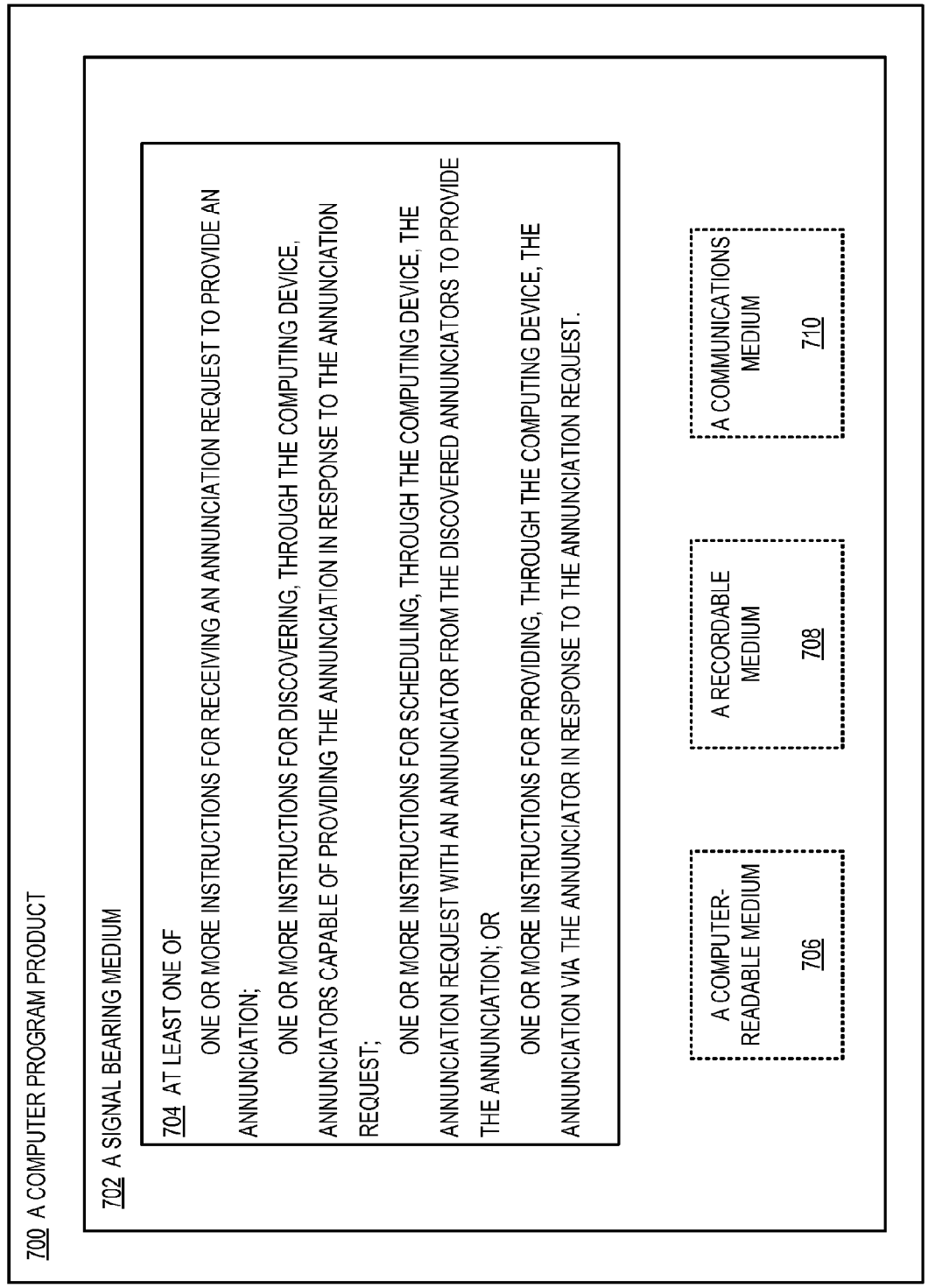

AUTOMATIC ANNUNCIATOR ALLOCATION

BACKGROUND

Unless otherwise indicated herein, the materials described in this section are not prior art to the claims in this application and are not admitted to be prior art by inclusion in this section.

In the recent past, users have been receiving more and more information via applications installed on their smart phones or other mobile devices. Typically, these applications may provide the user with annunciations, such as weather alerts, stock alerts, news alerts, and/or sports scores, in addition to basic functions typically provided by conventional phones, such as phone calls, text messages, and/or voice mails. Smart phones may provide these annunciations to users through annunciators, such as visual graphics, flashing lights, audible sounds, vibrations, and the like. As an increasing number of applications are installed on smart phones, the number of annunciations that are provided to the user may overwhelm the user, and unnecessarily inundate the user with information that may not be particularly relevant, interesting or important to the user at a particular time. Over time, this imbalance may become worse.

SUMMARY

The present disclosure describes various techniques related to allocating annunciators to provide annunciations in response to annunciation requests in a computing device. Some computing devices, such as a smart phone described herein include a processor and a memory storing a platform application. The platform application is configured to execute in the processor, causing the processor to receive an annunciation request from an application. The processor is also configured to discover an annunciator that can provide an annunciation in response to the annunciation request. The processor can then schedule the annunciation request with the annunciator and provide, via the annunciator, the annunciation in response to the annunciation request.

The present disclosure also describes a computer storage medium that includes computer-executable instructions stored thereon for a method which, when executed by a computing device, adapt the computing device to allocate annunciators to provide annunciations in response to annunciation requests. According to some example methods described herein, an annunciation request is received from an application. An annunciator to provide an annunciation in response to the annunciation request is discovered. The annunciation request is then scheduled with the annunciator. The annunciator then provides the annunciation in response to the application request.

The present disclosure also describes various techniques for a computer-implemented method for allocating annunciators to provide annunciations in response to annunciation requests According to some example methods, a computing device receives an annunciation request from an application. The computing device discovers an annunciator that can provide an annunciation in response to the annunciation request. The computing device then schedules the annunciation request with the annunciator. The computing device then provides the annunciation in response to the annunciation request through the annunciator.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 is a schematic illustrating a partial view of an example computer program product that includes a computer program for executing a computer process on a computing device; all arranged according to at least some embodiments presented herein.

DETAILED DESCRIPTION

Figure 1:
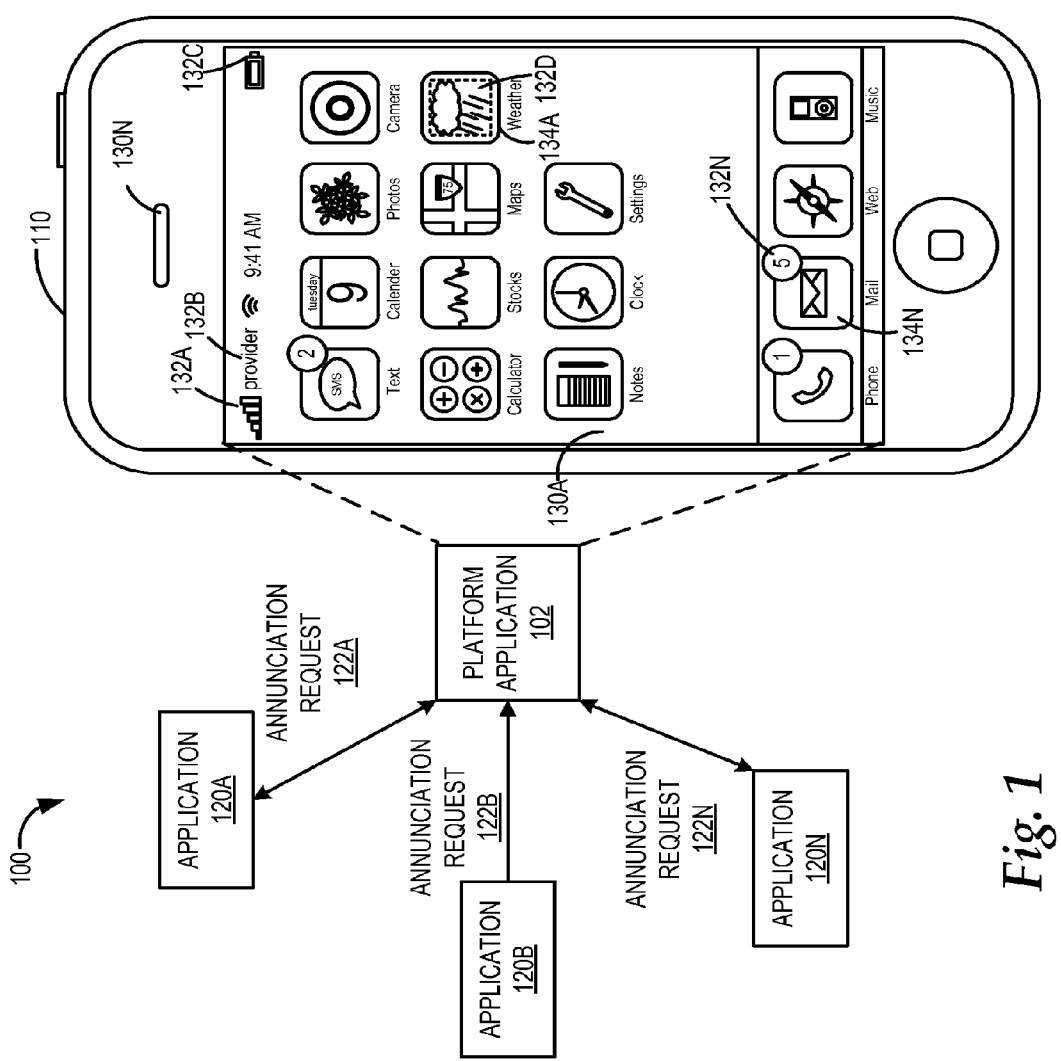
FIG. 1 is a block diagram illustrating a computing environment including a platform application that can receive annunciation requests from applications and provide, via annunciators of a computing device, annunciations in response to the annunciation requests.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures can be arranged, substituted, combined, separated, and designed in a wide variety of different configurations, all of which are explicitly contemplated herein.

This disclosure is generally drawn, inter alia, to methods, apparatus, systems, and computer program products related to allocating annunciators to provide annunciations in response to annunciation requests in a computing device, such as a smart phone, a mobile device, a television, a desktop, a laptop, and/or other computing device. Briefly stated, technologies described herein generally relate to allocating annunciators to provide annunciations in response to annunciation requests in an example computing device. The computing device may include a platform application. The platform application may be configured to receive at least one annunciation request from at least one application for providing at least one annunciation. The platform application may further be configured to discover annunciators capable of providing the annunciation. The platform application may then schedule the annunciation request with one of the discovered annunciators, and the platform application may cause the scheduled annunciator to provide the annunciation in response to the annunciation request. The technologies presented herein can allocate annunciators according to the demands of a user by determining a prioritization level of an annunciation request and an attention limit of the computing device such that the computing device can manage multiple annunciation requests without inundating a user with extraneous annunciations.

FIG. 1 is a block diagram illustrating a computing environment 100 including a platform application 102 that can receive annunciation requests 122A-122N from applications 120A-120N and provide, via annunciators 130A-130N of a computing device 110, annunciations 132A-132N in response to the annunciation requests 122A-122N, according to at least some embodiments presented herein. According to some embodiments, the computing device 110 may be a mobile device, such as a mobile phone, a smart phone, a tablet computer, a portable media player, or the like. The computing device 110 may also be a non-mobile device, such as a personal computer, television, a monitor, a vehicle stereo system, or the like. It should be appreciated that the computing device 110 may be any device that includes a processor and a memory that can store the platform application 102.

The applications 120A-120N may generally be referred to herein as applications 120. These applications 120 may be operating on the computing device 110 or in some example embodiments, on remote devices in communication with the computing device 110. According to some example embodiments, the applications 120 may be any type of computer application, including a text messaging application, a calendar application, or a weather application, amongst others. Some other examples of the applications 120 may include an application configured to display the strength of a cellular signal being received by the computing device 110, or an application configured to display the name of the cellular provider whose signal is being received by the computing device 110. In some example embodiments, one or more of these applications 120 may be configured to provide information associated with the application to the user of the computing device 110.

According to some embodiments, the applications 120 may be configured to notify the user of a particular event by issuing the annunciation requests 122A-122N to the platform application 102. The annunciation requests 122A-122N may generally be referred to herein as annunciation requests 122. The annunciation requests 122 may be requests to provide one or more annunciations, such as annunciations 132A-132N, which may generally be referred to herein as annunciations 132. An annunciation, such as any of the annunciations 132, may refer to a notification, such as an alert, warning, or reminder, which may be provided to a user in response to an annunciation request, such as the annunciation request 122A. According to some example embodiments, the annunciations 132 may be visual, audible or vibratory annunciations.

According to some example embodiments, and using the application 120A as an example, the application 120A may issue the annunciation request 122A after the application 120 determines that an event has occurred that should be brought to the attention of the user. Some examples of such an event may include a receipt of an incoming phone call, text message, or email, an issuance of a tornado warning, a drop of a stock price below a certain threshold price, a remaining battery life falling below a certain threshold, or the like. The duration that an annunciation may be presented may vary. In some instances, an annunciation may constantly be presented to provide real-time or near real-time information to the user. For example, a signal strength annunciation 132A may continuously provide a cellular signal strength to the user and a provider annunciation 132B may continuously provide the name of the provider whose cellular signal is being received by the computing device 110. Similarly, an annunciation 132C may continuously provide a remaining battery life of the computing device 110. According to some example embodiments, an audible annunciation may be presented once when the computing device receives a text message or an incoming phone call. However, if the user does not respond to the incoming text message or the incoming phone call, the computing device 110 may present a visual annunciator until the user takes an action in response to the visual annunciation. According to some embodiments, a weather annunciation 132D represented by the image surrounded by the dotted lines may provide current weather conditions. The weather annunciation 132D may be within the confines of a weather graphical icon 134A that may be selectable for accessing a weather application. It should be appreciated that, like the weather annunciation 132D, other annunciations may be provided within the confines of a graphical icon associated with a particular application. In this way, a user may know that the annunciation is related to a particular application. According to some example, the unread mail annunciation 132N indicates the number of unread mails. The unread mail annunciation 132N may be displayed on or in close proximity to a mail graphical icon 134N that may be selectable for accessing a mail application. It should be understood that the annunciations shown in FIG. 1 are merely example annunciations and that other annunciations not shown or mentioned may also be included within the scope of the instant application.

In some example embodiments, and using the application 120B as an example, the application 120B may issue the annunciation request 122B only upon determining that an event has occurred. The application 120B may specify the kind of content to be presented to the user. The application 120B may do so by issuing the annunciation request 122B to the platform application 102. The annunciation request 122B may include the content that the application 120 desires to present to the user and the duration for which the annunciation is to be provided. The annunciation request 122B may further include a type of annunciation to be presented. A detailed discussion of annunciations and the different types of annunciations is provided below following a discussion of the platform application 102.

The annunciation request 122B may also include an associated time value of content for the data being presented. The associated time value of content for the data being presented may refer to a measure of the value of the data over time. In other words, an annunciation request having a higher time value of content may indicate the data being more valuable to the user as compared to an annunciation request having a relatively lower time value of content. The time value of content associated with a specific annunciation request may typically be relative to the time value associated with content of other annunciation requests issued by the same application. In this way, the relative value of data from the application can be determined, and the platform application 102 may be able to prioritize pending annunciation requests based on their relative value of data. According to some embodiments, the annunciation requests 122 may not provide information regarding the type of annunciation to be provided or the type of annunciator to be used. Rather, an annunciation request may simply include an instruction to notify the user about the occurrence of a particular event.

According to some example embodiments, the applications 120 may have a list of events for which the annunciation requests 122 may automatically be issued. It should be appreciated that the applications 120 may also assign a time value of content to each annunciation request indicating the relative importance of a particular annunciation request compared to other annunciation requests.

According to example embodiments, a user may customize settings for one or more of the applications 120 to add or remove events for which the applications 120 should automatically issue the annunciation requests 122. Further, the user may also customize the settings of the one or more applications 120 to assign particular events an associated time content of value corresponding to the importance of the information to the user. In this way, annunciation requests associated with events that are more important to the user can be assigned a higher time value of content relative to annunciation requests associated with events that are less important to the user.

The platform application 102 may be configured to receive the annunciation requests 122 from the applications 120. The platform application 102 may also be configured to concurrently discover one or more annunciators capable of providing the annunciations 132 in response to the annunciation requests 122 received by the applications 120. In addition, the platform application 102 may determine available annunciators from the discovered annunciators and schedule pending annunciation requests with the available annunciators. An annunciator may be considered available as long as the annunciator is available to provide an annunciation under the current operating modes in which the computing device 110 is operating. The platform application 102 may further be configured to provide, via the available annunciators, annunciations 132 in response to the annunciation requests 122. Details regarding discovering annunciators, determining availability of the annunciators, and scheduling annunciation requests with the available annunciators will be described below with respect to FIG. 2.

As described above, an annunciation, such as the annunciations 132, may refer to a notification, such as an alert, warning, or reminder that may be provided to a user in response to the one or more annunciation requests 122. The annunciation may be a visual annunciation, an audible annunciation, or a vibratory annunciation. Some examples of visual annunciations may include displaying a Boolean value with text labels "connected" or "disconnected" on a portion of the display screen, a colored icon on the display screen, a colored light emitted by a light emitting diode (LED), a blinking light, a blinking display screen, or the like. Some examples of an auditory annunciation may include a ring tone, a beep, or a vocal annunciation such as "connected" or "disconnected", "you've got mail", or "turn left". Some examples of a vibratory annunciation may include vibrations of varying durations and intensities. It should be appreciated that a vibration may also produce a sound and therefore, may also be considered to be an audible annunciation in some embodiments.

The annunciators 130A-130N may generally be referred to herein as annunciators 130. The annunciators 130 may be components that are capable of providing one or more annunciations. There are different types of annunciators 130, such as visual annunciators that provide visual annunciations, auditory annunciators that provide audible annunciations, and vibratory annunciators that provide vibratory annunciations. Some examples of the visual annunciators may include a display screen, such as display screen 130A of the computing device 110, a portion of the display screen 130A, an LED, or any other light source. Some examples of auditory annunciators may include a speaker, such as speaker 130N, or any other sound generating component. Some examples of a vibratory annunciator may include any type of vibration generation component.

Figure 2:
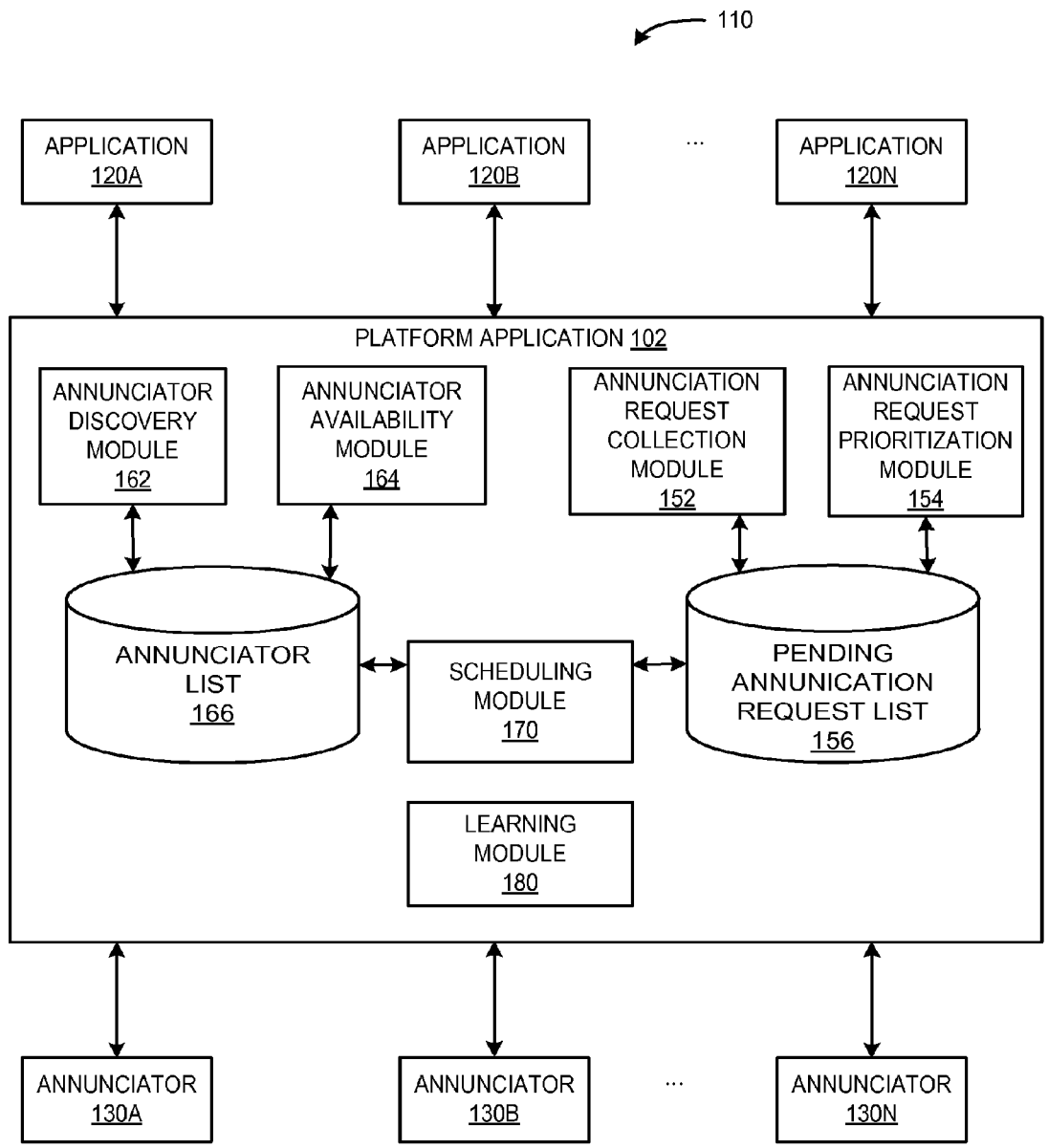
FIG. 2 is a block diagram illustrating an example platform application.

FIG. 2 is a block diagram illustrating an example platform application 102 in communication with one or more of the applications 120 and one or more of the annunciators 130, according to at least some embodiments presented herein. As described above, the platform application 102 may be configured to receive the annunciation requests 122 from the applications 120 and cause the annunciators 130 to provide the annunciations 132 in response to the annunciation requests received from the applications 120.

The platform application 102 may include an annunciation request collection module 152, an annunciation request prioritization module 154, an annunciator discovery module 162, an annunciator availability module 164, and a scheduling module 170. In addition, the platform application 102 may include a pending annunciation request list 156 containing one or more pending annunciation requests and an annunciator list 166 containing one or more annunciators.

The annunciation request collection module 152 may be configured to receive the one or more annunciation requests 122 from the one or more applications 120. The annunciation request collection module 152 may store these annunciation requests in the pending annunciation request list 156 as they are received by the annunciation request collection module 152. According to some example embodiments, the one or more annunciation requests 122 may include an application identifier identifying the application that issued the annunciation request, a type of annunciation to be provided, an associated time value of content, amongst other information.

The annunciation request prioritization module 154 may be configured to dynamically prioritize the pending annunciation requests stored in the pending annunciation request list 156. The annunciation request prioritization module 154 may adjust the priority of the pending annunciation requests as more annunciation requests 122 are received by the annunciation request collection module 152.

It should be appreciated that establishing a priority amongst some or all of the annunciation requests 122 issued by the one or more applications 120 may help improve the user's overall experience. Therefore, according to some example embodiments, a normalized standard for prioritizing the annunciation requests may be established. The prioritization module 154 may prioritize the pending annunciation requests by normalizing the prioritization level of each of the annunciation requests 122 based, in part, on the prioritization level of the annunciation request assigned by the issuing application, the priority level of the application relative to other applications, the current activity being performed by the user, user preferences, or the like.

According to some example embodiments, an application, such as the application 120A issuing the annunciation request 122A may be able to assign a prioritization level to each of the annunciation requests 122A the application 120 issues. As described above, the annunciation request 122A may be triggered by the occurrence of an event. The application 120A may be configured to determine the importance of the particular event and assign a prioritization level to the annunciation request 122A associated with the event. For instance, a stock application may assign a higher prioritization level to an annunciation request that is triggered by a 10% drop in a stock price of a stock in the user's portfolio than to an annunciation request that is triggered by a 1% gain in a stock price of a stock in the user's portfolio. Similarly, a weather application may assign an annunciation request triggered by an issuance of a tornado warning at the user's current location a higher prioritization level relative to an annunciation request that is triggered by an issuance of a tornado warning at a location 500 miles away from the user.

According to some example embodiments, the priority level of the application 120A relative to other applications may be manually assigned by the user or automatically by the platform application 102. For instance, according to some example embodiments, a priority level of a phone application may be higher than the priority level of a game application. Accordingly, any annunciation requests issued by the phone application will be assigned a higher prioritization level than any annunciation requests issued by the game application.

In addition, the current activity being performed by the user may also be relevant in determining prioritization levels of annunciation requests received from multiple applications. According to some example embodiments, an annunciation request involving a reminder for a scheduled meeting may be assigned a higher prioritization level than an annunciation request involving a traffic delay while the user is at work. However, when the user is driving, the annunciation request involving a traffic delay may be assigned a higher prioritization level than the annunciation request involving the reminder for the scheduled meeting.

An example of user preferences may include a user's preference for receiving finance news over weather updates. Accordingly, the annunciation request prioritization module 154 may be configured to assign annunciation requests issued by a finance news application, a higher prioritization level than annunciation requests issued by a weather application. Similarly, the annunciation request prioritization module 154 may also be configured to issue a higher prioritization level to an annunciation request associated with finance news than an annunciation request associated with a weather update even if the annunciation requests were issued by the same application.

The annunciation request prioritization module 154 may also be configured to assign annunciation requests based on the activity in which the user is currently engaged. In an example scenario, a user of the computing device may be driving. While the user is driving, the user may prefer to receive traffic updates and weather updates but may not prefer to receive finance news. Accordingly, the annunciation request prioritization module 154 may be configured to determine the activity in which the user is currently engaged and upon determining that the user is currently driving, the annunciation request prioritization module 154 may assign annunciation requests associated with traffic and weather updates a higher prioritization level than annunciation requests associated with finance news.

The annunciation request prioritization module 154 may further be configured to utilize the associated time value of content provided by the application to determine the prioritization level of annunciation requests issued by the same application. However, since the associated time value of content is arbitrarily assigned by each application and not normalized across different applications, the associated time value of content associated with annunciation requests issued by different applications may not need to be normalized to be prioritized according to the associated time value of content. The normalization may be performed by utilizing a value adjustment function to prioritize the associated time value of content function of the annunciation requests 122 issued by different applications. Therefore, utilizing the example in which the user is driving, the annunciation request prioritization module 154 may be configured to multiply the associated time value of content of an annunciation request associated with traffic or weather updates with a first value adjustment function, while the annunciation request prioritization module 154 may multiply the associated time value of content of an annunciation request associated with finance news by a smaller value adjustment function value than the first value adjustment function. In this way, the annunciation request prioritization module 154 may prioritize each of the pending annunciation requests in the pending annunciation request list 156 based on a normalized time value of content that may take into consideration the preferences of the user, the activity in which the user is currently engaged, or the like.

The platform application 102 may utilize the annunciator discovery module 162 to discover annunciators capable of providing annunciations. The platform application 102 may concurrently discover annunciators and prioritize pending annunciation requests. The annunciator discovery module 162 may discover the one or more annunciators 130 of the computing device 110 and one or more annunciators 130 that are accessible to the computing device 110. The annunciator discovery module 162 may also discover any new annunciators that may become accessible as new hardware is coupled to the computing device 110.

According to some example embodiments, the computing device 110 may be in communication with one or more remote devices. The remote device may include a television, a laptop, a desktop, a mobile device, another computing device similar to computing device 110, a vehicle stereo system, or any other device that includes one or more annunciators that is capable of communicating with the platform application 102. The annunciator discovery module 162 may also be configured to discover one or more annunciators of one or more remote devices communicating with the computing device. The annunciator discovery module 162 may inquire from the remote device if the remote device has any annunciators. The remote device may then provide the annunciator discovery module 162 a list of annunciators associated with the remote device, including one or more annunciators that are not a part of the remote device but are accessible through the remote device.

The annunciator discovery module 162 may be configured to update the annunciator list 166 containing a list of annunciators. The annunciator discovery module 162 may update the annunciator list 166 by adding the annunciators discovered by the annunciator discovery module 162 to the annunciator list 166 as annunciators are discovered. The annunciator discovery module 162 may also include additional information associated with one or more of the annunciators in the annunciator list 166, including a type of annunciator, a device associated with the annunciator, a type of data the annunciator can annunciate (text, sound, vibrations), applications whose annunciation requests the annunciator can provide an annunciation in response to, an annunciator cost function, or an annunciator attention function, or the like.

The annunciator cost function of an annunciator may map durations of annunciator usage to an abstract cost unit, which can be normalized for some or all of the annunciators that are available. The annunciator attention function of an annunciator may map annunciator usage to an abstract unit that indicates a quantity of a user's attention that the annunciator is likely to consume. In this way, annunciation requests for which the user may want to be interrupted may be scheduled with an annunciator with a higher annunciator attention function, while annunciation requests for which the user may not want to be interrupted may be scheduled with an annunciator having a lower annunciator attention function. According to some example embodiments, an LED on a mobile phone may have a lower annunciator attention function than a speaker of the mobile phone or a display screen of the mobile phone. It should be appreciated that the annunciator attention function may also be adjusted based on the environments of the computing device. At a rock concert, the mobile phone's speaker may have a lower annunciator attention function than the LED on the mobile phone since the background music of the rock concert may be too loud for the user to hear a ringtone emitted from the speaker of the mobile phone.

According to some example embodiments, the annunciator discovery module 162 may also include an annunciator power consumption level that indicates the amount of power a particular annunciator consumes to provide an annunciation. In this way, if the computing device is operating in a low power mode, annunciators that consume more power than a threshold power level may be unavailable to provide annunciations. It should be appreciated that the annunciator power consumption level may be proportional to the annunciator cost function of an annunciator. Accordingly, annunciators consuming less power may have lower annunciator cost functions.

The annunciator availability module 164 may be configured to determine an availability of the annunciators within the annunciator list 166 for providing an annunciation. An annunciator may be considered available as long as the annunciator is available to provide an annunciation under the current operating modes in which the computing device 110 is operating. Some examples of the operating modes include a power consumption mode, a user availability mode, a user activity mode, amongst others.

A power consumption mode may relate to the amount of power the computing device 110 is capable of consuming. According to some example embodiments, the power mode at which the computing device 110 is operating may alter the availability of one or more annunciators. For instance, when the computing device 110 is operating in a low power mode, annunciators that consume more than a threshold amount of power may not be available for providing annunciations. As an example, a first vibratory annunciator, such as a sequence of four vibrations may consume more power than the threshold amount of power that is defined by the low-power mode. Accordingly, the annunciator availability module 164 may indicate the first vibratory annunciation as being unavailable.

Similarly, if the computing device 110 is operating in a user availability mode, such as a meeting mode, auditory annunciators may become unavailable to provide audible annunciations. In this way, if the user is in a meeting, the user and others in the meeting may not be disturbed by audible annunciations that may have been provided by the computing device 110. Some other examples of user availability modes may include a silent mode, in which both auditory and vibratory annunciators may become unavailable as annunciations provided by auditory and vibratory annunciators generate some audible sound. Further, a user may set the computing device 110 to a loud mode if the user is in a noisy environment. In this operating mode, auditory annunciators are capable of providing audible annunciations at higher volumes in an attempt to draw the user's attention.

According to some example embodiments, a user availability mode at which the computing device 110 is operating may also alter the availability of one or more annunciators. For instance, when the computing device 110 is operating in a "do not disturb" mode, the annunciator availability module 164 may indicate that some or all of the annunciators are unavailable. However, if the computing device 110 is operating in a meeting mode, then the annunciator availability module 164 may indicate that only visual annunciators and vibratory annunciators are available, while auditory annunciators are unavailable.

According to some example embodiments, the annunciator discovery module 162 and the annunciator availability module 164 may continuously or periodically update the annunciator list 166 and the availability status of the annunciators in the annunciator list 166. In some example embodiments, if the computing device 110 is operating in a low power mode, the frequency of updating the annunciator list 166 may be reduced in an effort to conserve power. Conversely, if the computing device 110 is operating in a high power mode, the frequency of updating the annunciator list 166 may be increased as there are no power consumption restrictions.

According to some example embodiments, the annunciator discovery module 162 and the annunciator availability module 164 may work in conjunction with one another. The annunciator discovery module 162 may continuously or periodically monitor the computing device 110 and accessible remote devices that are in communication with the computing device 110 to discover one or more annunciators. As the annunciator discovery module 162 monitors the computing device 110 and/or the accessible remote devices, the annunciator discovery module 162 may identify a candidate annunciator that may be an annunciator of the computing device or an annunciator of one of the remote device, which is not in the annunciator list 166. Upon identifying the candidate annunciator, the annunciator discovery module 162 may add the annunciator to the annunciator list 166. The annunciator discovery module 162 may also utilize the services of the annunciator availability module 164 to determine if the candidate annunciator is available for providing annunciations under the current operating modes of the computing device 110. If the candidate annunciator is available to provide annunciations, the candidate annunciator may be identified as being available. As described above, the annunciator availability module 164 may continuously or periodically monitor the availability of the annunciators in the annunciator list 166 and update the annunciator list 166 to reflect any changes to the availability of the annunciators.

The scheduling module 170 may be configured to schedule the pending annunciation requests 122 in the pending annunciation request list 156 with the available annunciators in the annunciator list 166 over time. As described above, each annunciator may have an annunciator cost function and an annunciator attention function. Similarly, each annunciation request may have an associated time value of content function. According to some example embodiments, the scheduling module 170 may be configured to minimize the aggregate annunciator cost function while maximizing an aggregate annunciation presentation.

The aggregate annunciator cost function may be the sum of the annunciator cost functions of utilizing the annunciators to provide annunciations in response to annunciation requests. The aggregate annunciation presentation may be a function of the annunciation attention function of an annunciator and the associated time value of content of an annunciation request. In one example, the aggregate annunciation presentation is the product of the annunciation attention function of an annunciator and the associated time value of content of an annunciation request. In this way, annunciation requests with a high time value of content justify the use of an annunciator that is more likely to consume the attention of the user.

The scheduling module 170 may further be configured to not double-book annunciators and not exceed an attention rate limit of the computing device 110, which can vary dynamically. The attention rate limit of the computing device 110 is a quantitative limit, which sets the upper boundary on the amount of attention the annunciators can provide to the user at any given time. Therefore, once the attention rate limit of the computing device 110 is reached, additional annunciations cannot be provided to the user. As an example, if the attention rate limit of the computing device is set at 10 units, and an audible annunciator providing a first annunciation has an annunciation attention factor of 7, and a visual annunciator providing a second annunciation has an annunciation attention factor of 2, then the scheduling module 170 can only schedule another annunciation request with an annunciator that has an annunciation attention factor that is equal to less than 1. In this way, the user can limit the amount of information the user wishes to receive during a period of time so that the user is not overwhelmed by annunciations. It should be appreciated by those skilled in the art that the attention rate limit is lower when the computing device 110 is operating in a limited availability mode as compared to when the computing device 110 is operating in a full availability mode. According to example embodiments, the computing device 110 may operate in a declutter mode, in which the attention rate limit of the computing device is lower than the attention rate limit of the computing device 110 when the computing device 110 is operating in a normal mode. In this way, fewer annunciations are provided to the user while the computing device 110 is operating in the declutter mode.

The scheduling module 170, however, has to balance the annunciation requirements of the pending annunciation requests with the availability of annunciators present. Depending on the operating modes of the computing device 110, the scheduling module 170 may utilize various algorithms to determine whether one or more annunciations are to be provided for a particular annunciation request, and if so, when the one or more annunciations will be provided and which annunciators will provide the one or more annunciations. However, in order to optimize the user's overall experience, the scheduling module 170 may make these determinations based on the user's preferences while also attempting to satisfy preferences indicated within the annunciation request.

According to some example embodiments, the platform application 102 may also include a learning module 180 that is configured to monitor annunciations provided to the user and to further monitor the response of the user to the annunciations being provided. The learning module 180 may be able to discover trends indicating a user's preference for a particular type of annunciation during particular modes of operation. Similarly, the learning module 180 may also be configured to determine those applications to which the user is more responsive, and to which applications the user is less responsive. This may benefit the overall experience of the user since the various modules of the platform application 102 may then utilize these preferences to adjust the prioritization levels assigned to certain types of annunciation requests, the prioritization levels assigned to annunciation requests associated with certain types of applications, the annunciator attention functions of annunciators, the annunciator cost functions of annunciators, or the like. The learning module may also be able to determine user preferences based on the operating modes of the computing device, including the user preferences during the various user activity modes, the various power consumption modes, and the various user availability modes.

Figure 3:
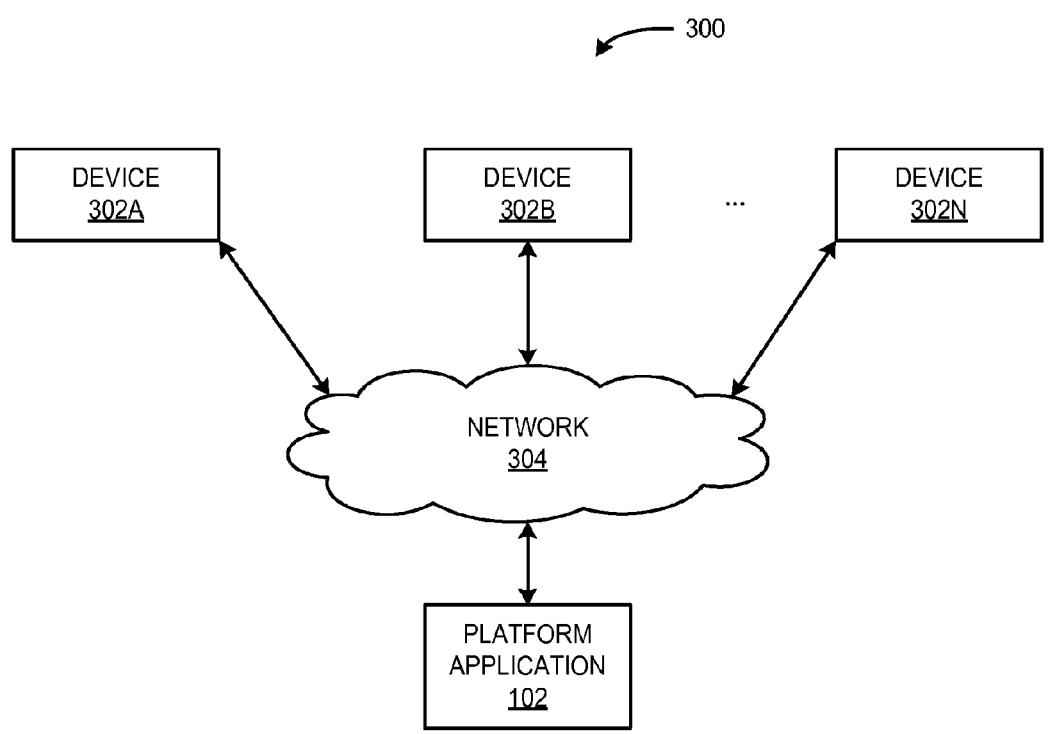
FIG. 3 is a block diagram illustrating multiple devices that can communicate with a platform application via a network.

FIG. 3 is a block diagram illustrating multiple devices 302A-302N that can communicate with a platform application 102 via a network 304, according to at least some embodiments presented herein. According to some example embodiments as shown in FIG. 3, the platform application 102 may not reside within the computing device 110. Rather, the platform application 102 may run in the cloud and communicate with one or more devices 302A-302N, generally referred to herein as devices 302, over the network 304. The devices 302 may be computing devices similar to computing device 110. The devices 302 may also be any other type of device that may include one or more applications capable of issuing annunciations. The devices 302 can also be any type of device that includes one or more annunciators that are capable of providing annunciations in response to annunciation requests.

The devices 302 may be connected to one another either via the network 304 or over other short or long range networks. The network 304 may include a wireless network such as, but not limited to, a Wireless Local Area Network (WLAN) such as a WI-FI network, a Wireless Wide Area Network (WWAN), a Wireless Personal Area Network (WPAN) such as BLUETOOTH, a Wireless Metropolitan Area Network (WMAN) such a WiMAX network, a cellular network, or a satellite network. Alternatively, the network 304 may be a wired network such as, but not limited to, a wired Wide Area Network (WAN), a wired Local Area Network (LAN) such as the Ethernet, a wired Personal Area Network (PAN), or a wired Metropolitan Area Network (MAN). The network 304 may include the Internet such that the platform application 102 communicates with the devices 302 via wireless or wired connections to the Internet.

Figure 4:
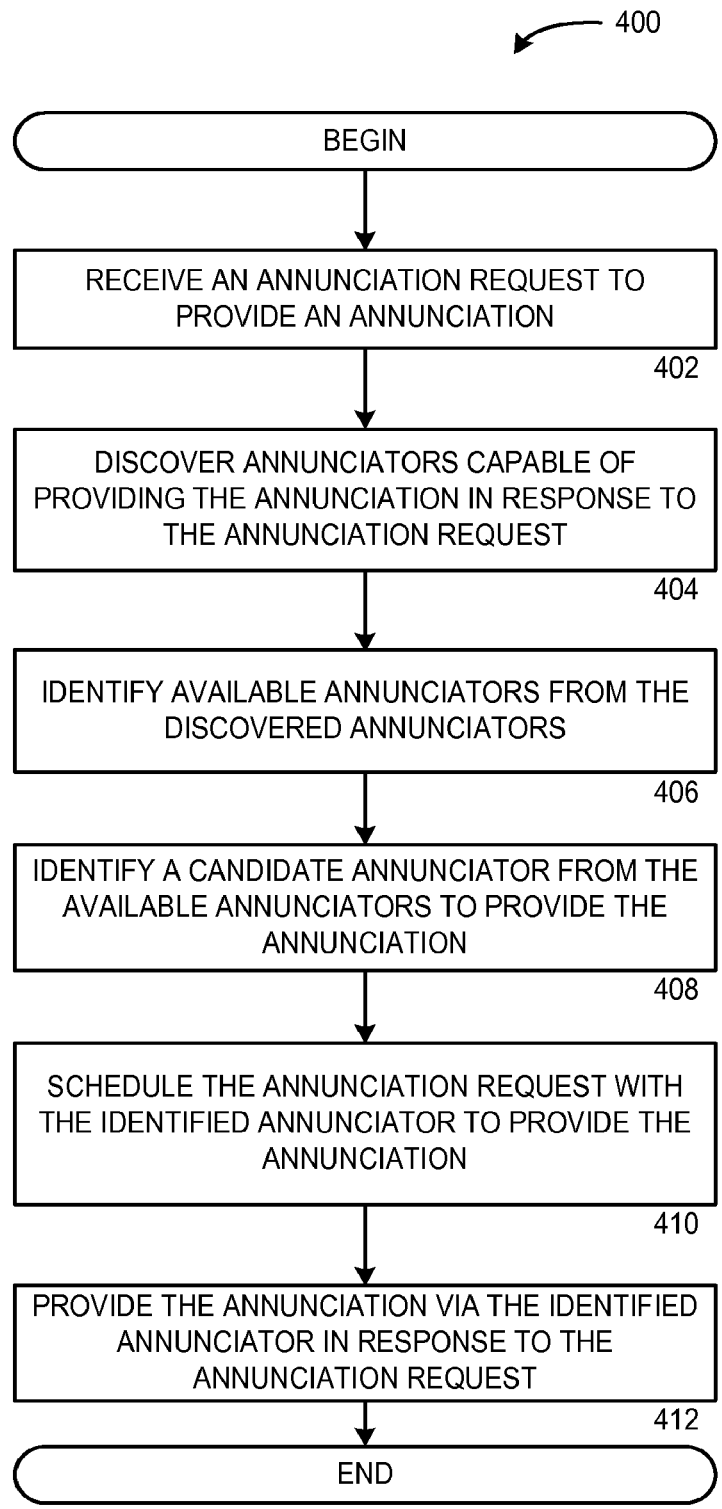
FIG. 4 is a flow diagram illustrating an example process for allocating annunciators.
Figure 5:
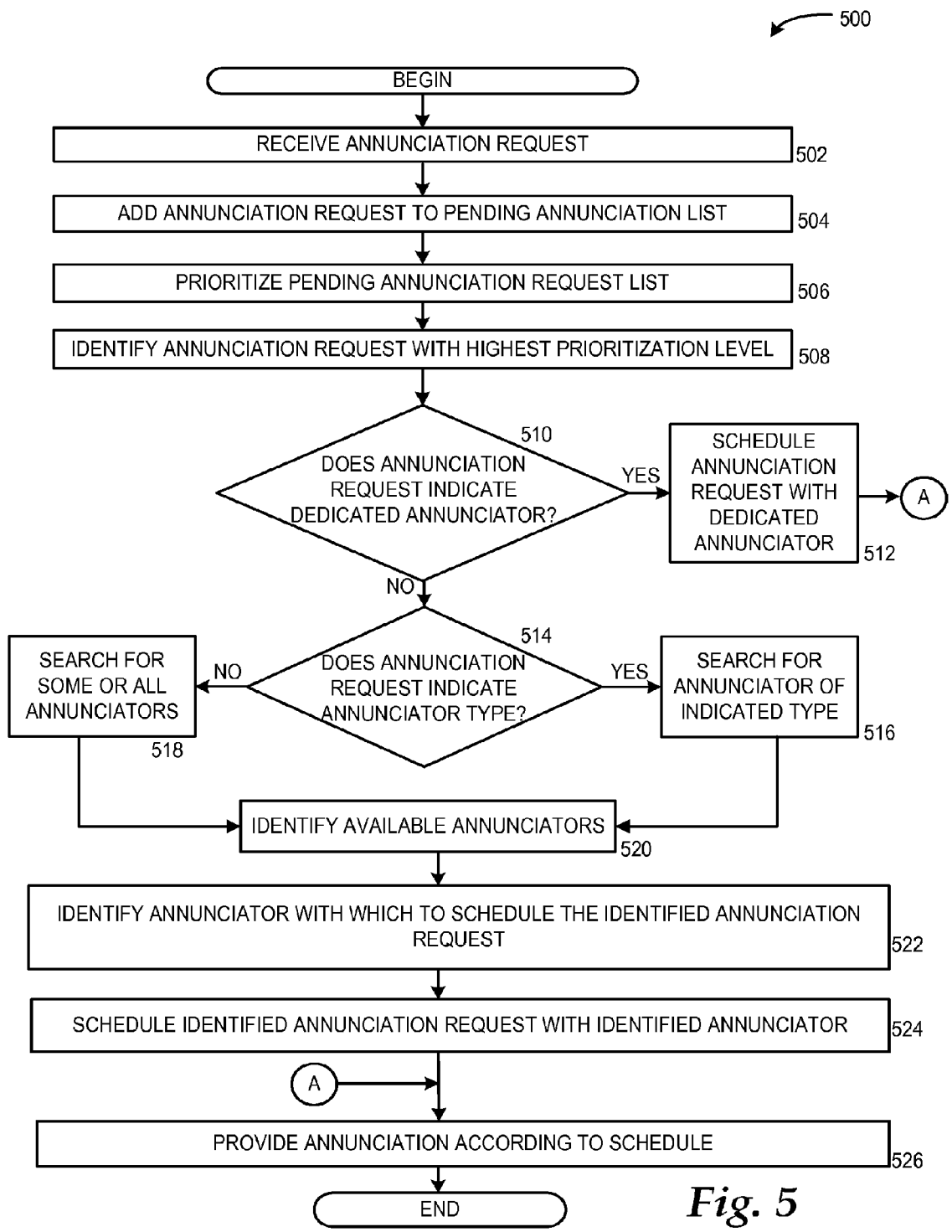
FIG. 5 is a flow diagram illustrating an example process for allocating annunciators.

Referring now to FIGS. 4 and 5, additional details will be provided regarding the embodiments presented herein for allocating annunciators to provide annunciations in response to annunciation requests in a computing device. In particular, FIG. 4 is a flow diagram illustrating an example process 400 for allocating annunciators, according to at least some embodiments presented herein. Process 400 may include one or more operations, functions or actions as illustrated by one or more of blocks 402, 404, 406, 408, 410, 412, 414, 416 and/or 418.

It should be appreciated that the blocks described herein may be implemented as a sequence of computer implemented instructions or program modules running on a computing system, as interconnected machine logic circuits or circuit modules within the computing system, or some combination thereof. The implementation is a matter of choice dependent on the performance and other requirements of the various embodiments. Some of the logical operations described herein are referred to variously as state operations, functions, structural devices, actions, or modules. These operations, functions, structural devices, actions and modules may be implemented in software, in firmware, in special purpose digital logic, and any combination thereof. It should also be appreciated that in some implementations one or more of the illustrated blocks may be eliminated, combined or separated into additional blocks than those shown in the figures and described herein. These blocks may also be performed sequentially, in parallel, or in a different order than those described herein.

The process 400 may begin at block 402 (receive an annunciation request to provide an annunciation). Block 402 may be followed by block 404 (discover annunciators capable of providing the annunciation in response to the annunciation request). Block 404 may be followed by block 406 (identify available annunciators from the discovered annunciators). Block 406 may be followed by block 408 (identify a candidate annunciator from the available annunciators to provide the annunciation). Block 408 may be followed by block 410 (schedule the annunciation request with the identified annunciator to provide the annunciation). Block 410 may be followed by block 412 (provide the annunciation via the identified annunciator in response to the annunciation request).

After block 412 processing may terminate. Further details about each block will be described below.

At block 402 (receive an annunciation request to provide an annunciation), the platform application 102 may be configured to receive an annunciation request. The application request may be issued by an application. Typically, the application 120 may issue the annunciation request upon determining that an event has occurred for which the user of the computing device should be notified. The annunciation request may include the content that the application 120 desires to present to the user. The annunciation request 122 may further include the type of annunciation to be presented, and an associated time value of content. According to embodiments, an annunciation request collection module 152 may receive the annunciation requests and store them in a pending annunciation request list 156, which contains one or more pending annunciation requests and information associated with the annunciation requests. According to some example embodiments, the annunciation request prioritization module 154 may prioritize the pending annunciation requests stored in the pending annunciation requests list.

At block 404 (discover annunciators capable of providing the annunciation in response to the annunciation request), the platform application 102 may be configured to discover one or more annunciators of the computing device and of annunciators of remote devices in communication with the computing device. According to some example embodiments, the annunciator discovery module 162 of the platform application 102 may be configured to discover the one or more annunciators. The annunciator discovery module 162 may be configured to gather information associated with one or more of the discovered annunciators during the discovery operation. Examples of information gathered by the annunciator discovery module 162 may include an associated power consumption level of the annunciator, the type of annunciator, and the annunciation attention function of the annunciator, which quantifies the relative amount of a user's attention the annunciator will consume.

At block 406 (identify available annunciators from the discovered annunciators), the annunciator availability module 164 of the platform application 102 may be configured to identify available annunciators from the discovered annunciators. It should be appreciated that some annunciators accessible by the platform application 102 may be available to provide one or more annunciation requests. For instance, an auditory annunciator may not be able to provide a visual annunciation. Further, an auditory annunciator that is scheduled for a first annunciation request at a particular time may not be available for a second annunciation request requesting an annunciation at the same time as the first annunciation request. According to some example embodiments, the annunciator discovery module 162 and the annunciator availability module 164 may maintain and update an annunciator list 166 that contains information pertaining to the discovered annunciators and their availability.

At block 408 (identify a candidate annunciator from the discovered annunciators to provide the annunciation in response to an annunciation request), the scheduling module 170 of the platform application 102 may be configured to identify a candidate annunciator from the available annunciators to provide an annunciation in response to an annunciation request. The scheduling module 170 may communicate with the pending annunciation requests list to identify the annunciation request that has the highest prioritization level. Upon identifying the annunciation request with the highest prioritization level, the scheduling module 170 may identify a candidate annunciator from the annunciator list 166 that is capable of providing an annunciation in response to the identified annunciation request. The scheduling module 170 may consider identifying a candidate annunciator based on the pending annunciation requests in such a manner that the scheduling module 170 maximizes the annunciation presentation while minimizing the aggregate annunciator cost function.

At block 410 (schedule the annunciation request with the identified annunciator to provide the annunciation), the scheduling module 170 of the platform application 102 may be configured to schedule the identified annunciation request with the identified annunciator. The scheduling module 170 may be configured to schedule one or more annunciation requests with one or more annunciators simultaneously. For instance, an annunciation request indicating that an incoming call is being received, the platform application 102 may schedule the display screen, the speaker, and the vibration generation component of the computing device to provide respective annunciations simultaneously.

At block 412 (provide the annunciation via the identified annunciator in response to the annunciation request), the platform application 102 may be configured to cause the identified annunciator to provide the annunciation in response to the identified annunciation request according to the schedule. It should be appreciated that multiple annunciations may be provided simultaneously by multiple annunciators. After block 412, the process 400 may either repeat (e.g., periodically, continuously, or on demand as needed) or terminate.

FIG. 5 is a flow diagram illustrating an example process for allocating annunciators, according to at least some embodiments presented herein. The process 500 may begin at block 502 (receive annunciation request). Block 502 may be followed by block 504 (add annunciation request to pending annunciation request list 156). Block 504 may be followed by block 506 (prioritize pending annunciation request list 156). Block 506 may be followed by block 508 (identify annunciation request with highest prioritization level). Block 508 may be followed by decision block 510 (does annunciation request indicate dedicated annunciator). Decision block 510 may be followed by block 512 (schedule annunciation request with dedicated annunciator) or decision block 514 (does annunciation request indicate annunciator type). Block 512 may be followed by connector A, which causes the process 500 to continue to block 526. Decision block 514 may be followed by block 516 (search for annunciator of indicated type) or block 518 (search for some or all annunciators). Blocks 516 and 518 may be followed by block 520 (identify available annunciators). Block 520 may be followed by block 522 (identify annunciator with which to schedule the identified annunciation request). Block 522 may be followed by block 524 (schedule identified annunciation request with identified annunciator). Block 524 may be followed by block 526 (provide annunciation via identified annunciator in response to identified annunciation request). After block 526 processing may terminate. Further details about each block will be described below.

At block 502 (receive annunciation request), the platform application 102 may be configured to receive an annunciation request from an application. The annunciation request may include the content that the application 120 desires to present to the user. The annunciation request 122 may further include the type of annunciation to be presented, and an associated time value of content.

At block 504 (add annunciation request to pending annunciation request list 156), the annunciation request collection module 152 of the platform application 102 may be configured to add the annunciation request received from the application to the pending annunciation request list 156. The pending annunciation request list 156 may include one or more additional annunciation requests and information associated with the annunciation requests.

At block 506 (prioritize pending annunciation request list 156), the annunciation request prioritization module 154 may be configured to prioritize the annunciation requests in the pending annunciation request list 156 by assigning each annunciation request a prioritization level indicating the priority of the annunciation request relative to other annunciation requests in the pending annunciation request list 156. The annunciation request prioritization module 154 may be configured to assign prioritization levels based on one or more factors, including the priority level of an application issuing the request, the prioritization level of the annunciation request assigned by the application that issued the request, the associated time content of value, the type of annunciator requested to provide the annunciation, availability of an annunciator capable of providing the annunciation, or the like.

At block 508 (identify annunciation request with highest prioritization level), the scheduling module 170 may be configured to identify the annunciation request with the highest prioritization level in the pending annunciation request. In this way, the scheduling module 170 may be configured to provide the user with an annunciation related to the annunciation request demanding the user's immediate attention .

At decision block 510 (does annunciation request indicate dedicated annunciator), the scheduling module 170 may be configured to determine whether the identified annunciation request indicates a dedicated annunciator to provide an annunciation. A dedicated annunciator is an annunciator that is capable of providing annunciations in response to annunciation requests from one particular application. Typically, dedicated annunciators may include visual annunciators that occupy specific real estate on a display screen. For instance, a dedicated annunciator may include the annunciators that provide the annunciations 132A-132C. The annunciators 132D, 32N may also be dedicated but may be capable of being displayed at various different locations on the display screen based on the placement of the graphical icon representing the particular application. For instance, the weather annunciation 132D may be displayed within the weather graphical icon 134A representing the weather application by a visual weather annunciator. The visual weather annunciator does not necessarily occupy a specific piece of real estate on the display screen 130A, but rather, is tied to real estate on the display screen 130A that is defined by the weather graphical icon 134A representing the weather application.

If, at decision block 510, the scheduling module 170 determines that the annunciation request indicates a dedicated annunciator, the routine 500 proceeds to block 512 (schedule annunciation request with dedicated annunciator), where the scheduling module 170 may be configured to schedule the annunciation request with the dedicated annunciator. According to some example embodiments, the scheduling module 170 may first determine if the dedicated annunciator is available. If the dedicated annunciator is available, the scheduling module 170 may provide the annunciation instantly. However, if the dedicated annunciator is unavailable, the scheduling module 170 may schedule the annunciation for when the dedicated annunciator is available. However, if the dedicated annunciator is unavailable for long enough that the time value of content of the annunciation request becomes zero, the annunciation request may not be executed. Similarly, the scheduling module 170 may also continuously monitor the pending annunciation request list 156 and may schedule a second annunciation request with the dedicated annunciator if the second annunciation request indicates utilizing the dedicated annunciator and has a higher time value of content than the identified annunciation request. According to some alternate embodiments, the scheduling module 170 may provide an annunciation in response to the identified annunciation request until the second annunciation request is identified by the scheduling module 170 for execution. From block 512, the process 500 proceeds to block 526.

If at decision block 510, the scheduling module 170 determines that the annunciation request does not indicate a dedicated annunciator, the routine 500 proceeds to decision block 514 (does annunciation request indicate annunciator type), where the scheduling module 170 may be configured to determine if the identified annunciation request indicates a type of annunciator. As described above, an annunciator may be one or a combination of a visual annunciator, an auditory annunciator and a vibratory annunciator. Similarly, the types of annunciators may be classified differently based on the annunciator attention function, which may represent the quantity of a user's attention that the annunciator is likely to consume, or the annunciator cost function, which may represent the cost of utilizing a particular annunciator. Annunciators having higher annunciator cost functions may be less likely to be scheduled to provide annunciators as compared to annunciators having lower annunciator cost functions.

If, at decision block 514, the scheduling module 170 determines that the annunciation request indicates an annunciator type, the routine 500 proceeds to block 516 (search for annunciator of indicated type), where the scheduling module 170 may be configured to search for annunciators of the indicated type, or more generally, annunciators that fit the criteria of the annunciation request. The scheduling module 170 may utilize the annunciator list 166 that includes some or all of the discovered annunciators to search for candidate annunciators that fit the criteria of the annunciation request.

If at decision block 514, the scheduling module 170 determines that the annunciation request does not indicate an annunciator type, the routine 500 proceeds to block 518 (search for some or all annunciators), where the scheduling module 170 may be configured to search for some or all types of annunciators.

At block 520 (identify available annunciators), the annunciator availability module 164 may be configured to identify some or all of the candidate annunciators that are available to provide an annunciation in response to the identified annunciator based on the criteria indicated in the annunciation request.

At block 522 (identify annunciator with which to schedule the identified annunciation request), the scheduling module 170 may be configured to identify an annunciator with which the schedule the identified annunciation request. The scheduling module 170 may identify a particular annunciator based on the annunciator cost function and the annunciator attention function. According to some example embodiments, for a particular annunciation request, the annunciation presentation, which is the product of the total value of content and the annunciator attention function may be maximized, while the annunciator cost function may be minimized. Therefore, excluding other scheduling factors, an annunciator having the highest annunciator attention function and the lowest annunciator cost function should be scheduled with the pending annunciation request. However, if other pending annunciation requests exist, the scheduling module 170 may balance the interests of selecting annunciators based only on the needs of the identified annunciation request with selecting annunciators based on the needs of other pending annunciation requests.

At block 524 (schedule identified annunciation request with identified annunciator), the scheduling module 170 may be configured to schedule the identified annunciation request with the identified annunciator. This may include providing an annunciation for a specific duration of time or until the user responds to the annunciation. Since the scheduling module 170 or the platform application 102 does not know if the user will respond to the annunciation, a maximum duration may be defined for which the annunciation is provided.

For instance, when an incoming phone call is being received, the scheduling module 170 may cause the display screen to provide a visual annunciation with the caller's details, the speaker to provide an audible annunciation, and the vibratory annunciator to provide a vibration. These annunciators may provide respective annunciations for up to thirty seconds but may stop providing annunciations upon the user either answering the call or ignoring the call. The user may alternatively, decide to take action by pressing a silent input key, such that the speaker and the vibratory annunciator stop providing annunciations but the display screen continues to provide the visual annunciation. Accordingly, the scheduling module 170 may typically schedule an annunciator for the maximum duration but is capable of making the annunciator available if the user takes action before the maximum duration.

At block 526 (provide annunciation via identified annunciator in response to identified annunciation request), the scheduling module 170 may be configured to provide the annunciation via the identified annunciator in response to the identified annunciation request. As described above, the annunciation may be provided until the user responds to the annunciation. Further, the annunciation may be provided according to the schedule established by the scheduling module 170, and therefore may stop providing an annunciation after a certain duration. In some example embodiments, a particular annunciation may be provided until the user responds to the annunciation or until another annunciation request having a higher time value of content than the executed annunciation request is scheduled with the annunciator being used. After block 526, the process 500 may either repeat (e.g., periodically, continuously, or on demand as needed) or terminate.

Figure 6:
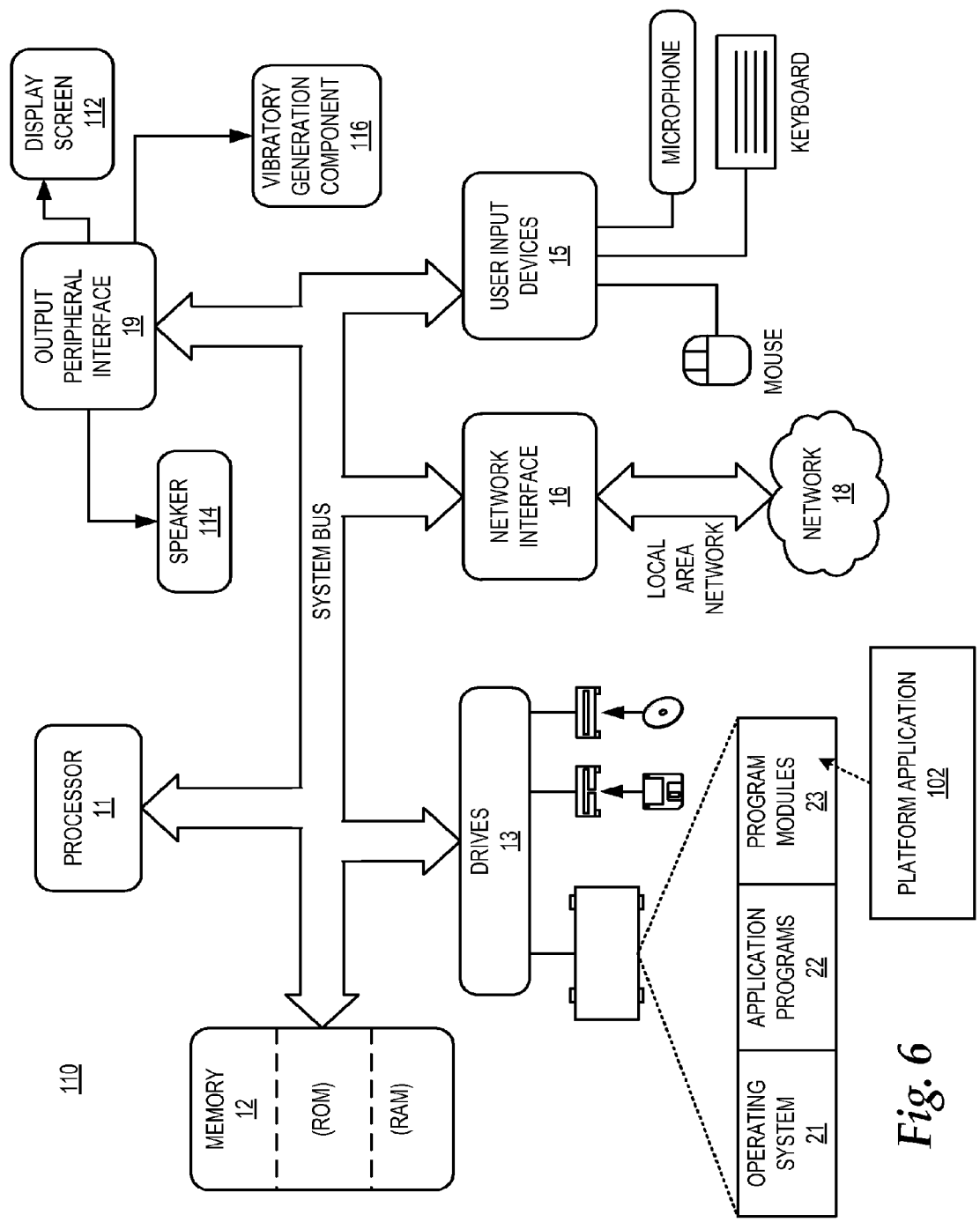
FIG. 6 is a block diagram illustrating an example computing device.

With reference to FIG. 6, an example computing device for implementing various embodiments presented herein will be discussed. The computing device 110 may include a processor 11, a memory 12 and one or more drives 13. The drives 13 and their associated computer storage media may provide storage of computer readable instructions, data structures, program modules 23 and other data for the computing device 110. The computing system may be adapted to support embodiments for allocating annunciators to provide annunciations in response to annunciation requests. For example, the computing system may comprise program modules 23 such as the platform application 102 previously described herein. Various embodiments may include computers, dedicated hardware, or embedded computing systems.

The computing device 110 may be implemented as a conventional computer system, an embedded control computer, a laptop or a server computer, a mobile device, a set-top box, a kiosk, a vehicular information system, a mobile telephone, a customized machine, or some other hardware platform. The processor 11 may be a general purpose processor, a processor core, a multiprocessor, a multicore processor, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof. The processor 11 may support parallel dynamic optimization leveraging multicore processors as discussed herein.

The drives 13, other storage devices, or their associated computer-readable storage media may store an operating system 21, application programs 22, and program modules 23. The computing device 110 may include user input devices 15 through which a user may enter commands and data. Input devices may include an electronic digitizer, a microphone, a keyboard, a pointing device, or any combination thereof. Examples of pointing devices may include a mouse, trackball, light pen, touch screen, or touch pad. Other input devices to the computing device 110 may include a joystick, game pad, satellite dish, scanner, or the like. Input devices may be coupled to processor 11 through a user input interface that is coupled to a system bus. The input devices may also be coupled by other interface and bus structures, such as a parallel port, game port or a universal serial bus (USB). Computers such as computing device 110 may also include other peripheral output devices such as speaker a display screen 130A, a speaker 130N, and a vibration generating device 116 which may be coupled through an output peripheral interface 19 or similar interface.

The computing device 110 may operate in a networked environment using logical connections to one or more devices, including but not limited to, a mobile device, a television, a vehicle sound system, or a remote computer coupled to network interface 16. The remote computer may be a personal computer, a server, a router, a network PC, a peer device, or other common network node. The remote computer may include many or all of the elements described herein relative to the computing device 110. Networking environments may include networks (WAN), local area networks (LAN), intranets, the Internet, or combinations thereof.

When used in a LAN or wireless LAN (WLAN) networking environment, the computing device 110 may be coupled to the LAN through a network interface 16 or a network adapter. When used in a WAN networking environment, the computing device 110 may include a modem or other mechanism for establishing communications over the WAN. The WAN may include the Internet, the illustrated network 18, various other networks, or any combination thereof. It should be appreciated that other mechanisms of establishing a communications link, ring, mesh, bus, cloud, or network between computers may be used.

According to one or more embodiments, computing device 110 may be configured such that the processor 11 and/or program modules 23 may allocate annunciators to provide annunciations in response to annunciation requests in accordance with various embodiments presented herein. The computing device 110 may include one or more instances of a physical computer-readable storage medium or media associated with drives 13 or other storage devices. The system bus may enable the processor 11 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 12, whether characterized as RAM, ROM, flash, or other types of volatile or non-volatile memory technology. The media may also represent secondary storage, whether implemented as the storage drives 13 or otherwise. Hard drive implementations may be characterized as solid state, or may include rotating media storing magnetically-encoded information.

The storage media may include one or more program modules 23 for allocating annunciators to provide annunciations in response to annunciation requests. The program modules 23 may include software instructions that, when loaded into the processor 11 and executed, transform a general-purpose computing system into a special-purpose computing system customized to facilitate all, or part of, the annunciator allocation techniques disclosed herein. As detailed throughout this description, the program modules 23 may provide various tools or techniques by which the computing device 110 may participate within the overall systems or operating environments using the components, logic flows, and/or data structures discussed herein.

The processor 11 may be constructed from any number of transistors or other circuit elements, which may individually or collectively assume any number of states. More specifically, the processor 11 may operate as a state machine or finite-state machine. Such a machine may be transformed to a second machine, or specific machine by loading executable instructions contained within the program modules 23. These computer-executable instructions may transform the processor 11 by specifying how the processor 11 transitions between states, thereby transforming the transistors or other circuit elements constituting the processor 11 from a first machine to a second machine, wherein the second machine may be specifically configured to support allocating annunciators to provide annunciations in response to annunciation requests. The states of either machine may also be transformed by receiving input from one or more user input devices 15, network interfaces 16, other peripherals, other interfaces, or one or more users or other actors. Either machine may also transform states, or various physical characteristics of various output devices such as printers, speakers, video displays, or otherwise.

Encoding the program modules 23 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, or the like. For example, if the storage media are implemented as semiconductor-based memory, the program modules 23 may transform the physical state of the semiconductor memory 12 when the software is encoded therein. For example, the software may transform the state of transistors, capacitors, or other discrete circuit elements constituting the semiconductor memory 12.

As another example, the storage media may be implemented using magnetic or optical technology such as drives 13. In such implementations, the program modules 23 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Turning now to FIG. 7, a schematic illustrates a partial view of an example computer program product 700 that includes a computer program for executing a computer process on a computing device, arranged according to at least some embodiments presented herein. An illustrative embodiment of the example computer program product is provided using a signal bearing medium 702, and may include at least one instruction of 704: one or more instructions for receiving an annunciation request to provide an annunciation; one or more instructions for discovering, through the computing device, annunciators capable of providing the annunciation in response to the annunciation request; one or more instructions for scheduling, through the computing device, the annunciation request with an annunciator from the discovered annunciators to provide the annunciation; or one or more instructions for providing, through the computing device, the annunciation via the annunciator in response to the annunciation request. The one or more instructions may be, for example, computer executable and/or logic implemented instructions. In some embodiments, the signal bearing medium 702 of the one or more computer program products 700 include a computer readable medium 706, a recordable medium 708, and/or a communications medium 710.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, computer program product 700 may be conveyed to one or more modules of the described systems by an RF signal bearing medium 702, where the signal bearing medium 702 is conveyed by a wireless form of communications medium 710 (e.g., a wireless communications medium conforming with the IEEE 802.11 standard).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, components, elements, apparatuses, or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

In instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A computer-implemented method to allocate annunciators, comprising:
   receiving, from an application through a computing device having a processor and a memory, an annunciation request to provide an annunciation, thereby providing a pending annunciation request that will provide the annunciation;
   discovering, through the computing device, annunciators capable of providing the annunciation in response to the pending annunciation request;
   scheduling, through the computing device, the pending annunciation request with an annunciator from the discovered annunciators to provide the annunciation, wherein scheduling the pending annunciation request is based on
      minimizing a sum of an annunciator cost functions of utilizing the annunciators capable of providing the annunciation response to the pending annunciation request, and
      maximizing a product of an annunciation attention function of each annunciator capable of providing the annunciation in response to the pending annunciation request and an associated time value of content of the annunciation request; and
   providing, through the computing device, the annunciation via the annunciator in response to the pending annunciation request and according to the scheduling.

2. The computer-implemented method of claim 1, wherein discovering annunciators capable of providing the annunciation in response to the pending annunciation request comprises discovering annunciators associated with the computing device and annunciators associated with remote devices in communication with the computing device.

3. The computer-implemented method of claim 1, wherein discovering annunciators capable of providing the annunciation in response to the pending annunciation request, comprises:
   identifying a candidate annunciator associated with the computing device;
   in response to identifying the candidate annunciator associated with the computing device, determining whether the candidate annunciator is available that provides the annunciation in response to the pending annunciation request;
   in response to determining that the candidate annunciator is available that provides the annunciation in response to the pending annunciation request, adding the candidate annunciator as an available annunciator in a list of available annunciators;
   monitoring an availability of the available annunciators in the list of available annunciators; and
   updating the list of available annunciators to reflect changes to the availability of the available annunciators in the list of available annunciators.

4. The computer-implemented method of claim 1, wherein receiving the annunciation request to provide the annunciation comprises receiving the annunciation request from the application operating on the computing device.

5. The computer-implemented method of claim 1, wherein receiving the annunciation request to provide the annunciation comprises receiving the annunciation request from the application operating on a remote device coupled to the computing device.

6. The computer-implemented method of claim 1, wherein receiving the annunciation request to provide the annunciation comprises receiving at least one of an application identifier indicating the application that issued the annunciation request, a type of annunciator desired to provide the annunciation, or a prioritization level of the annunciation request.

7. The computer-implemented method of claim 1, further Comprising;
 determining a power mode at which the computing device is operating; and
 wherein scheduling the pending annunciation request with the annunciator from the discovered annunciators to provide the annunciation comprises:
 in response to determining the power mode at which the computing device is operating, selecting, from the discovered annunciators, the annunciator that is configured to provide the annunciation in response to the pending annunciation request at the power mode at which the computing device is operating; and
 scheduling the pending annunciation request with the selected annunciator to provide the annunciation.

8. The computer-implemented method of claim 1, wherein receiving the annunciation request from the application associated with the computing device comprises:
 receiving, from the application that issued the annunciation request, a type of annunciator configured to provide a particular type of annunciation; and
 wherein scheduling the pending annunciation request with the annunciator from the discovered annunciators to provide the annunciation comprises:
 selecting, from the discovered annunciators, the annunciator that is configured to provide the particular type of annunciation in response to pending annunciation request; and
 scheduling the pending annunciation request with the selected annunciator to provide the annunciation.

9. The computer-implemented method of claim 1, wherein scheduling the pending annunciation request with the annunciator from the discovered annunciators to provide the annunciation comprises:
 identifying pending annunciation requests to which the annunciation has yet to be provided;
 in response to identifying the pending annunciation requests, determining a prioritization level associated with each of the pending annunciation requests; and
 in response to determining the prioritization level associated with each of the pending annunciation requests, prioritizing the pending annunciation requests according to the prioritization level of each of the pending annunciation requests such that annunciations for the pending annunciation requests where the prioritization level is higher is provided prior to the annunciations for the pending annunciation requests where the prioritization level is lower.

10. The computer-implemented method of claim 9, wherein determining the prioritization level associated with each of the pending annunciation requests comprises:
 identifying the application that issued the pending annunciation request;
 determining a priority level of the application; and
 assigning the prioritization level to the pending annunciation request, the prioritization level corresponding to the priority level of the application.

11. The computer-implemented method of claim 1, further comprising:
 determining whether the computing device is operating in a declutter mode;
 in response to determining that the computing device is operating in the declutter mode, determining a prioritization level of the annunciation request;
 determining whether the prioritization level of the annunciation request is higher than a threshold prioritization level;
 in response to determining that the prioritization level of the annunciation request is higher than the threshold prioritization level, providing the annunciation in response to the annunciation request; and
 in response to determining that the prioritization level of the annunciation request is not higher than the threshold prioritization level, delaying providing the annunciation in response to the annunciation request until the computing device is no longer operating in the declutter mode.

12. The computer-implemented method of claim 1, wherein providing the annunciation via the annunciator in response to the pending annunciation request comprises:
 determining whether the computing device is operating in an available mode in which the computing device is configured to provide the annunciation in response to the pending annunciation request;
 in response to determining that the computing device is operating in the available mode, instantly providing the annunciation in response to the pending annunciation request;
 in response to determining that the computing device is not operating in the available mode, determining whether the computing device is operating in a reduced availability mode in which the computing device is configured to provide the annunciation in response to selective annunciation requests;
 in response to determining that the computing device is operating in the reduced availability mode, determining a prioritization level of the annunciation request;
 determining whether the prioritization level of the annunciation request is higher than a threshold prioritization level;
 in response to determining that the prioritization level of the annunciation request is higher than the threshold prioritization level, instantly providing the annunciation in response to the annunciation request; and
 in response to determining that the prioritization level of the annunciation request is not higher than the threshold prioritization level, providing the annunciation in response to the annunciation request when the computing device transitions from operating in the reduced availability mode to the available mode.

13. The computer-implemented method of claim 1, wherein the associated time value of content function indicates a value of annunciating the content over a period of time.

14. A computing device, comprising:
 a processor;
 a memory coupled to the processor;
 a plurality of annunciators to provide annunciations; and a platform application configured to execute in the processor from the memory, and when executed by the processor, causes the processor to receive an annunciation request from an application operating on the computing device to thereby provide a pending annunciation request that will provide the annunciation, discover an annunciator from the plurality of annunciators to provide the annunciation in response to the pending annunciation request, schedule the pending annunciation request with the annunciator from the plurality of annunciators to provide the annunciation, wherein scheduling the pending annunciation request is based on minimization of a sum of annunciator cost functions of utilizing the annunciators configured to provide the annunciation in to the pending annunciation request, and maximization of a product of an annunciation attention function of each annunciator configured to provide the annunciation in response to the pending annunciation request and an associated time value of content of the annunciation request, and provide, via the annunciator, the annunciation in response to the pending annunciation request and according to the schedule.

15. The computing device of claim 14, wherein the annunciator provides at least one of a visual annunciation, an audio annunciation, or a vibratory annunciation.

16. The computing device of claim 14 wherein the annunciator comprises at least one of a light emitting component, a graphical icon, an audio emitting component, or a vibration generating component.

17. The computing device of claim 14, wherein when the annunciator from the plurality of annunciators to provide annunciation in response to the pending annunciation request is discovered, the platform application, when executed by the processor, further causes the processor to discover annunciators associated with the computing device and annunciators associated with remote devices in communication with the computing device.

18. The computing device of claim 14, further comprising a user input component that allows input of a response when the processor provides the annunciation.

19. The computing device of claim 14, wherein the annunciation request comprises at least one of an application identifier indicating the application that issued the annunciation request, a type of annunciator desired to provide the annunciation, or a prioritization level of the annunciation request.

20. The computing device of claim 14, wherein the plurality of annunciators to provide annunciations comprises:

a first annunciator that is configured to provide the annunciation when the annunciation request is issued by more than one application; and a second annunciator that is configured to provide the annunciation when the annunciation request is issued by only one application.

21. The computing device of claim 14, wherein the platform application in response to being executed by the processor, further causes the processor to operate the computing device in a declutter mode where a first annunciation is provided in response to a first annunciation request having a first prioritization level and a second annunciation is not provided in response to a second annunciation request having a second prioritization level.

22. A non-transitory computer readable storage medium having computer-executable instructions stored thereon which, in response to being executed by a computer, causes the computer to:

receive, from an application through a computing device having a processor and a memory, an annunciation request to provide an annunciation, thereby providing a pending annunciation request that will provide the annunciation;

discover, through the computing device, annunciators capable of providing the annunciation in response to the pending annunciation request; schedule, through the computing device, the annunciation request with the pending annunciator from the discovered annunciators to provide the annunciation, wherein scheduling the pending annunciation request is based on minimization of a sum of annunciator cost functions of utilizing the annunciators capable of providing the annunciation in response to the pending annunciation request, and maximization of a product of an annunciation attention function of each annunciator capable of providing the annunciation in response to the pending annunciation request and an associated time value of content of the annunciation request; and provide, through the computing device, the annunciation via the annunciator in response to the pending annunciation request and according to the schedule.

23. The non-transitory computer readable storage medium of claim 22 having further computer-executable instructions stored thereon which, in response to being executed by the computer, causes the computer to:

determine whether a remote device is capable of communicating with the computer; in response to determination that the remote device is capable of communicating with the computer, establish communications between the computer and the remote device;

discover, on the remote device, annunciators capable of providing the annunciation in response to the pending annunciation request; and in response to determination that the remote device is capable of providing the annunciation in response to the pending annunciation request, schedule the pending annunciation request with the annunciator on the remote device to provide the annunciation.

24. The non-transitory computer readable storage medium of claim 23, wherein to receive the pending annunciation request to provide the annunciation, the computer readable storage medium, in response to being executed by the computer, further causes the computer to receive a request to utilize a particular type of annunciator that provides the annunciation; and wherein the computer readable storage medium having further computer-executable instructions stored thereon which, when executed by the computer, causes the computer to:

in response to receipt of the request to utilize the particular type of annunciator that provides the annunciation, discover an annunciator of the particular type of annunciator capable of providing the annunciation;

in response to discovery of the annunciator of the particular type of annunciator, schedule the pending annunciation request with the annunciator of the particular type; and provide, via the annunciator of the particular type, the annunciation in response to the pending annunciation request.

25. The non-transitory computer readable storage medium of claim 22 having further computer-executable instructions stored thereon which, in response to being executed by the computer, causes the computer to:
in response to providing the annunciation, receive a response; and in response to receiving the response cease to provide the annunciator.

* * * * *

UNITED STATES PATENT AND TRADEMARK OFFICE
CERTIFICATE OF CORRECTION

PATENT NO. : 8,683,493 B2
APPLICATION NO. : 13/122189
DATED : March 25, 2014
INVENTOR(S) : Stephens, Jr.

It is certified that error appears in the above-identified patent and that said Letters Patent is hereby corrected as shown below:

On Title Page 2, in item (56), under "OTHER PUBLICATIONS", in Column 1,
Line 5, delete "Rask" and insert -- Task --, therefor.

In the Specification:

In Column 15, Line 39, delete "32N" and insert -- 132N --, therefor.

In Column 16, Line 10, delete "If at" and insert -- If, at --, therefor.

In Column 16, Line 39, delete "If at" and insert -- If, at --, therefor.

In Column 18, Line 16, delete "thereof" and insert -- thereof. --, therefor.

In the Claims:

In Column 22, Line 29, in Claim 1, delete "an annunciator" and insert -- annunciator --, therefor.

In Column 22, Line 31, in Claim 1, delete "annunciation response" and
insert -- annunciation in response --, therefor.

In Column 23, Line 18, in Claim 7, delete "Comprising;" and insert -- comprising: --, therefor.

In Column 25, Line 18, in Claim 14, delete "in to" and insert -- in response to --, therefor.

In Column 25, Line 38, in Claim 17, delete "annunciation in" and
insert -- the annunciation in --, therefor.

Signed and Sealed this
Twenty-second Day of July, 2014

Michelle K. Lee
*Deputy Director of the United States Patent and Trademark Office*